(12) United States Patent
Abe

(10) Patent No.: US 10,148,184 B2
(45) Date of Patent: Dec. 4, 2018

(54) MULTIPHASE CONVERTER

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Takenori Abe, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/767,396

(22) PCT Filed: Sep. 9, 2016

(86) PCT No.: PCT/JP2016/076593
§ 371 (c)(1),
(2) Date: Apr. 11, 2018

(87) PCT Pub. No.: WO2017/073182
PCT Pub. Date: May 4, 2017

(65) Prior Publication Data
US 2018/0301987 A1   Oct. 18, 2018

(30) Foreign Application Priority Data

Oct. 28, 2015  (JP) ................................ 2015-211614

(51) Int. Cl.
*G05F 1/565* (2006.01)
*H02M 3/158* (2006.01)
(Continued)

(52) U.S. Cl.
CPC ......... *H02M 3/1584* (2013.01); *H02M 1/088* (2013.01); *H02M 1/36* (2013.01); *H02M 3/157* (2013.01); *H02M 2001/0009* (2013.01)

(58) Field of Classification Search
CPC ...... G05F 1/565; H02M 3/157; H02M 3/1584
(Continued)

(56) References Cited

U.S. PATENT DOCUMENTS

2007/0296387 A1* 12/2007 Dong .................... H02M 3/157
                                                              323/285
2012/0161741 A1*  6/2012 Zambetti ................ G05F 3/245
                                                              323/294

(Continued)

FOREIGN PATENT DOCUMENTS

JP     2009-100497 A    5/2009
JP     2015-136202 A    7/2015

OTHER PUBLICATIONS

Search Report for PCT/JP2016/076593, dated Oct. 11, 2016.

*Primary Examiner* — Adolf Berhane
*Assistant Examiner* — Nusrat Quddus
(74) *Attorney, Agent, or Firm* — Honigman Miller Schwartz and Cohn LLP

(57) ABSTRACT

A configuration is realized that can subject, when operation of a multiphase conversion unit starts, voltage conversion units to control of gradually increasing a target value for output, and can suppress a reverse flow, more easily and further avoiding a loss. A multiphase converter is provided with a control unit configured to control a multiphase conversion unit, and the control unit sequentially drives, when operation of the multiphase conversion unit is started, a plurality of voltage conversion units by offsetting the points in time at which the driving is started against each other. Also, the control unit determines, each time the driving of a voltage conversion unit is started, whether or not (Continued)

the value detected by the detection unit has reached an individual threshold associated with the number of driven voltage conversion units, and starts to drive the next voltage conversion unit when the value has reached the individual threshold.

1 Claim, 5 Drawing Sheets

(51) Int. Cl.
  *H02M 1/36* (2007.01)
  *H02M 3/157* (2006.01)
  *H02M 1/088* (2006.01)
  *H02M 1/00* (2006.01)
(58) Field of Classification Search
  USPC .......................................... 323/271–289, 315
  See application file for complete search history.

(56) References Cited

U.S. PATENT DOCUMENTS

| 2018/0034449 A1* | 2/2018 | Hasegawa | H02M 3/157 |
| 2018/0248465 A1* | 8/2018 | Higashi | H02M 1/08 |

\* cited by examiner

FIG. 6
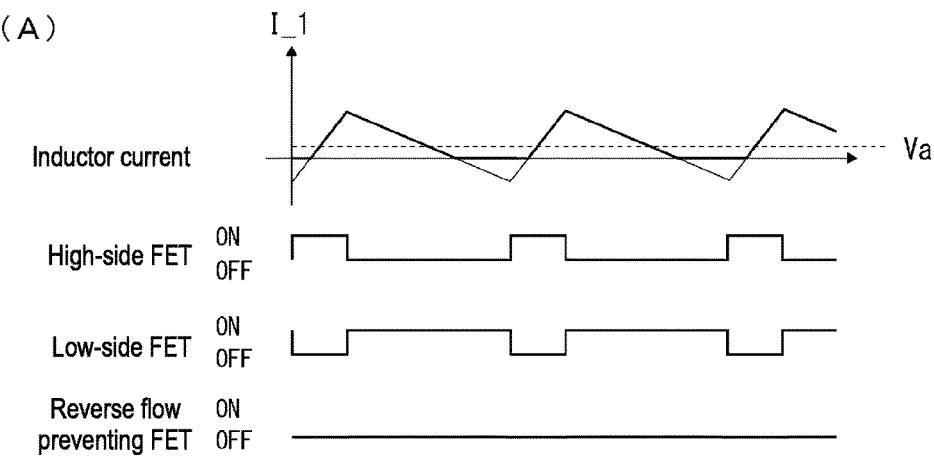
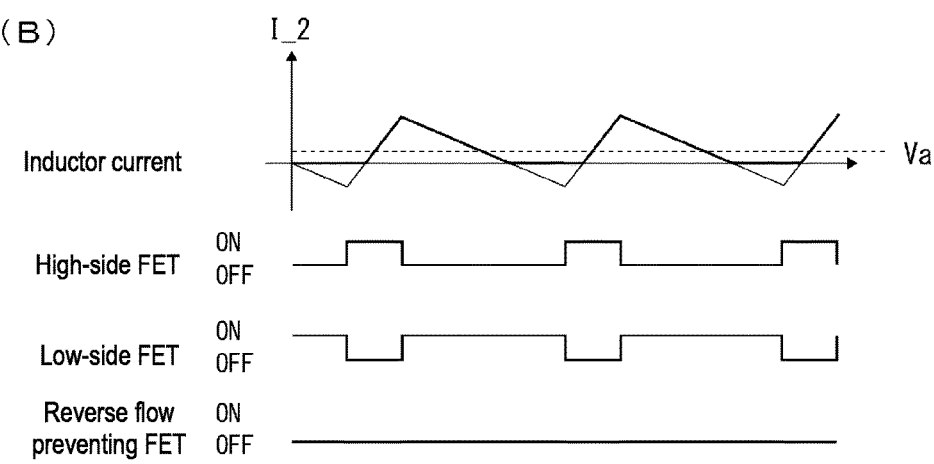
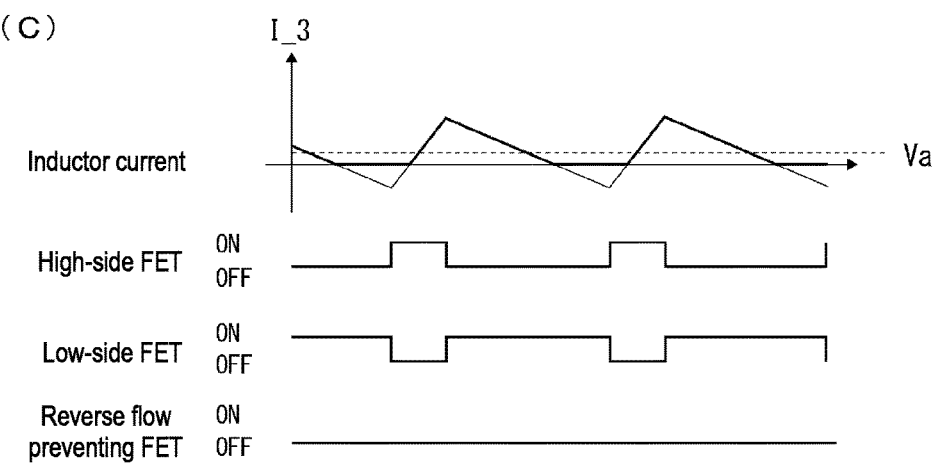

MULTIPHASE CONVERTER

CROSS-REFERENCE TO RELATED APPLICATIONS

This application is the U.S. national stage of PCT/JP2016/076593 filed Sep. 9, 2016 which claims priority of Japanese Application No. JP 2015-211614.

TECHNICAL FIELD

The present invention relates to a multiphase converter.

BACKGROUND

Multiphase DC/DC converters with a configuration in which a plurality of voltage conversion units are connected in parallel to each other are known as DC/DC converters that drive switch elements to step up or down a DC voltage. Examples of this type of multiphase converter include a technique as disclosed in JP Patent No. 4452383, and in this technique, the number and combination of switching circuits to be activated are varied depending on the output current.

Meanwhile, in this type of DC/DC converter, soft start control of gradually increasing a target value for output is performed in the initial stage immediately after the start of output, in order to prevent an inrush current at the start of output. The soft start control employs, for example, a control method of gradually increasing a control target current value with a constant climb gradient toward a final target current value, and performing feedback control such as PID control based on the control target current value, so that the output is increased.

However, if soft start control is performed immediately after the start of output in this way, then a time period will be created in which an inductor current falls below 0, due to a reduction in the amount of output current during the soft start control, and the output current flows reversely in this time period. Because such a reverse flow state will cause a large loss, some sort of countermeasure is required, but no such countermeasure against a reverse flow state is proposed in the technique of JP Patent No. 4452383.

For example, FIG. 4 schematically shows, in a synchronous rectification type multiphase converter that has the same hardware configuration as that of FIG. 1 except for the control unit 3, the current waveform of a single phase during the soft start control performed thereon. In FIG. 4, "Va" indicated by a dotted line schematically shows an average current value. In FIG. 4, the waveform of an inductor current immediately after the start of the soft start control is indicated by a solid line, and when the output current (average current Va) is small as shown in FIG. 4, the inductor current falls below 0 in time periods before and after a rising flank of a high-side FET, and reverse flows occur in these time periods (see areas A1 and A2 of FIG. 4).

In order to prevent such a reverse flow, it is conceivable, as shown in FIG. 5, to switch off the low-side FET in the time periods in which the reverse flow occurs, for example. With this, it is possible to interrupt the conduction of a reverse flow path from an output line to the ground via the low-side FET, and prevent the reverse flow. However, in this method, PWM control using hardware or software is complicated.

As another method, as shown in FIGS. 6(A) to (C), a method is conceivable in which, similar to the configuration shown in FIG. 1, reverse flow preventing FETs (elements similar to switching elements SC1, SC2, SC3, and SC4 of FIG. 1) are arranged for respective phases, and during soft start control for each phase, the reverse flow preventing FET of the phase is kept in the OFF state, and the output current of the phase is rectified by its parasitic diode. However, in this method, the loss is larger than in a case where output is performed while the reverse flow preventing FETs for all the phases are switched on.

The present invention was made in view of the above-described circumstances, and it is an object thereof to realize a configuration that can subject, when operation of a multiphase conversion unit is started, voltage conversion units to control of gradually increasing a target value for output, and can suppress a reverse flow, more easily and further avoiding a loss.

SUMMARY

According to the present invention, a multiphase converter includes a multiphase conversion unit provided with a plurality of voltage conversion units each configured to convert a voltage input to an input-side conductive path and output the converted voltage to an output-side conductive path, a control unit configured to individually control the voltage conversion units using control signals so that an output of the multiphase conversion unit is equal to a target value, and to subject, when operation of the multiphase conversion unit is started, the voltage conversion units to control of gradually increasing the target value for their output, and a detection unit configured to detect a value reflecting an output current from the multiphase conversion unit.

The control unit is configured to sequentially drive, when the operation of the multiphase conversion unit is started, the plurality of voltage conversion units by offsetting the points in time at which their driving is started against each other, to determine, each time a voltage conversion unit is started to be driven, whether or not the value detected by the detection unit has reached an individual threshold associated with the number of voltage conversion units of the multiphase conversion unit that have started to be driven, and starts to drive the next voltage conversion unit when the value has reached the individual threshold.

According to the multiphase converter of the present invention, the control unit sequentially drives, when the operation of the multiphase conversion unit is started, the plurality of voltage conversion units by offsetting the points in time at which the driving is started. Also, after the driving of each of voltage conversion units that are sequentially driven has been started, control is performed such that the output current is increased to a threshold that corresponds to the number of operating voltage conversion units (number of driven phases), and then the next voltage conversion unit is driven. In other words, each time a voltage conversion unit is started to be driven, an output current is increased to a current value that corresponds to the number of driven phases at the moment to ensure the amount of current, and then the next voltage conversion unit is driven. By performing such control, it is possible to shorten a time period in which an output current is reduced (time period in which an output current is so small that a reverse flow occurs) after the start of each of the second voltage conversion units onward that are sequentially driven, and to suppress a reverse flow of the output current.

Accordingly, it is possible to realize a configuration that can subject, when operation of a multiphase conversion unit is started, voltage conversion units to control of gradually increasing a target value for output, and can suppress a reverse flow, more easily and further avoiding a loss.

BRIEF DESCRIPTION OF DRAWINGS

FIGS. 6 show graphs and timing charts illustrating the relationship between an inductor current, ON/OFF of FETs of one phase of a multiphase converter serving as Comparative Example 3, and elapsed time.

DETAILED DESCRIPTION OF PREFERRED EMBODIMENTS

Hereinafter, preferred modes of the invention will be exemplified.

According to the present invention, each voltage conversion unit may be provided with, on its output-side conductive path, a switching element including a switching portion configured to be switched between an ON state and an OFF state in accordance with a signal from the outside, and a diode portion that is arranged in parallel to the switching portion, and is configured to allow current flow in a regular output direction and interrupt current flow in a reverse direction. The control unit may be configured to switch the switching portion of the voltage conversion unit that is first driven when the operation of the multiphase conversion unit is started to the OFF state, during a time period from the start of the driving of this voltage conversion unit until the value detected by the detection unit reaches a predetermined threshold smaller than the individual threshold, and to switch the switching portion to the ON state after the value has reached the predetermined threshold.

When each of the voltage conversion units is subjected to the control of gradually increasing a target value for output, during a time period immediately after the start of the driving of the voltage conversion unit that is first driven, an output current will be very small, and in the normal drive, a reverse flow is likely to occur. In contrast, in the above-described configuration, during the initial time period after the driving of the first voltage conversion unit is started (time period from the start of the driving until the value detected by the detection unit reaches a predetermined threshold), the switching portion is switched off, and an electric current is caused to flow by diode rectification using a diode portion, and thus it is possible to reliably prevent a reverse flow even during the initial time period in which an output current is reduced. Furthermore, after the value detected by the detection unit has reached the predetermined threshold, that is, after an output current by the voltage conversion unit that is first driven has been increased to some extent, the switching portion can be switched to the ON state, and thus it is possible to reliably reduce a loss compared to a configuration in which diode rectification is continued.

Embodiment 1

The following will describe Embodiment 1 in which the present invention is embodied.

Figure 1:
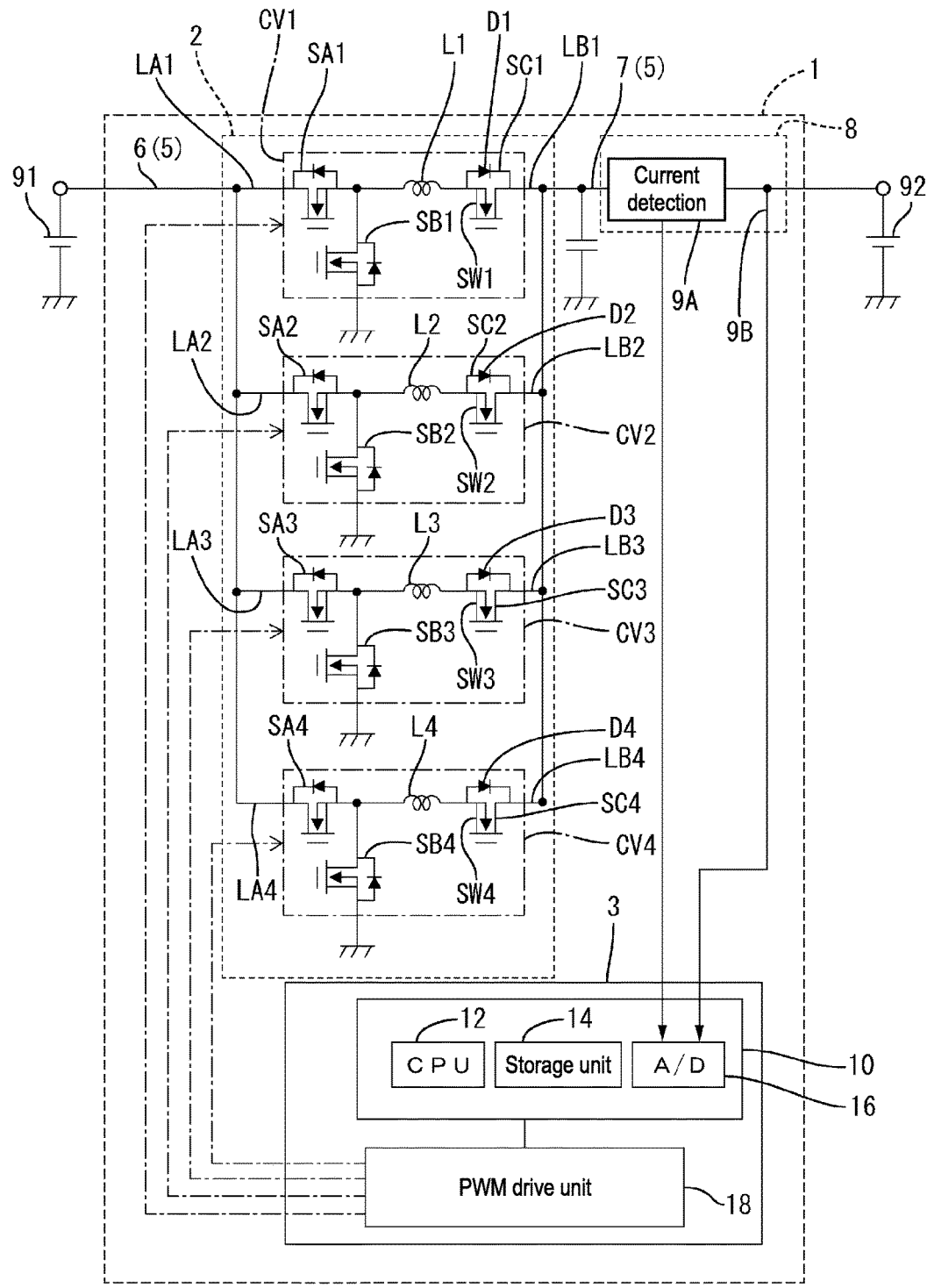
FIG. 1 is a circuit diagram schematically illustrating an example of a multiphase converter according to Embodiment 1.

A multiphase converter 1 shown in FIG. 1 is configured as, for example, an on-board multiphase DC/DC converter, and is configured to convert a DC voltage (input voltage) applied to a first conductive path 6 by stepping down that voltage with a multiphase scheme, and to output an output voltage obtained by stepping down the input voltage to a second conductive path 7.

The multiphase converter 1 is provided with: a power supply line 5 including the first conductive path 6 and the second conductive path 7; a multiphase conversion unit 2 including m voltage conversion units CV1, CV2, . . . CVm configured to convert an input voltage and output the converted voltage; and a control unit 3 configured to individually control the voltage conversion units CV1, CV2, . . . CVm using control signals (PWM signals). Note that m, which is the number of the voltage conversion units, should be an integer of 2 or more. Hereinafter, a description will be given taking a configuration shown in FIG. 1, that is, a case where m=4, as a representative example.

The first conductive path 6 is configured as, for example, a primary side (high voltage side) power supply line to which a relatively high voltage is applied, and is conductively connected to the high potential-side terminal of a primary side power supply portion 91, and has a configuration in which a predetermined DC voltage (48V, for example) is applied from the primary side power supply portion 91. The first conductive path 6 is connected to input-side conductive paths (individual input paths) LA1, LA2, LA3, and LA4 of the voltage conversion units CV1, CV2, CV3, and CV4. The primary side power supply portion 91 is constituted by, for example, an electrical storage means such as a lithium-ion battery or an electrical double layer capacitor, and the high potential-side terminal thereof is kept at 48V for example, and the low potential-side terminal thereof is kept at a ground potential (0V) for example.

The second conductive path 7 is configured as a secondary side (low voltage side) power supply line to which a relatively low voltage is applied. The second conductive path 7 is conductively connected to, for example, the high potential-side terminal of a secondary side power supply portion 92, and has a configuration in which a DC voltage (12V, for example) smaller than an output voltage of the primary side power supply portion 91 is applied from the secondary side power supply portion 92. The secondary side power supply portion 92 is constituted by, for example, an electrical storage means such as a lead storage battery, and the high potential-side terminal thereof is kept at 12V for example, and the low potential-side terminal thereof is kept at the ground potential (0V) for example.

The multiphase conversion unit 2 is provided between the first conductive path 6 and the second conductive path 7. The multiphase conversion unit 2 includes m voltage conversion units CV1, CV2, . . . CVm that are connected in parallel between the first conductive path 6 and the second conductive path 7. The m voltage conversion units CV1, CV2, . . . CVm all have the same configuration, and each serves as a synchronous rectification type step-down converter. The input-side conductive paths LA1, LA2, . . . LAm of the m voltage conversion units CV1, CV2, . . . CVm are branched from the first conductive path 6. Also, output-side conductive paths LB1, LB2, . . . LBm of the m voltage conversion units CV1, CV2, . . . CVm are connected to the second conductive path 7, which is a common output path. Note that the m voltage conversion units CV1, CV2, . . . CVm correspond to a first phase, a second phase, . . . , an m-th phase, respectively.

The following will describe a k-th phase voltage conversion unit CVk of the m voltage conversion units CV1, CV2, . . . CVm, where k is an integer equal to or smaller than m. The k-th phase voltage conversion unit CVk functions to convert a voltage input to an input-side conductive path LAk and output the converted voltage to an output-side conductive path LBk. The k-th phase voltage conversion unit CVk is provided with a high-side switching element SAk, a low-side switching element SBk, an inductor Lk, and a protective switching element SCk. For example, the first phase voltage conversion unit CV1 is provided with a high-side switching element SA1, a low-side switching element SB1, an inductor L1, and a protective switching element SC1, and the second phase voltage conversion unit CV2 is provided with a high-side switching element SA2, a low-side switching element SB2, an inductor L2, and a protective switching element SC2. The same applies to the third and the fourth phase voltage conversion units.

In the k-th phase voltage conversion unit CVk, the switching element SAk is configured as an N-channel type MOSFET, and the input-side conductive path LAk, which is branched from the first conductive path 6, is connected to a drain of the switching element SAk. A drain of the low-side switching element SBk and one end of the inductor Lk are connected to a source of the switching element SAk. The drain of the switching element SBk is connected to a connection point between the switching element SAk and the inductor Lk, and a source of the switching element SBk is grounded. The other end of the inductor Lk is connected to a source of the switching element SCk. A drain of the switching element SCk is connected to the second conductive path 7.

In the k-th phase voltage conversion unit CVk, the switching element SCk is arranged on the output-side conductive path LBk. The switching element SCk is configured as an N-channel type MOSFET, and has a source connected to the inductor Lk, and a drain connected to the common output path (second conductive path 7). In the switching element SCk, a MOSFET unit SWk serving as a switching portion that is switched between an ON state and an OFF state in accordance with a signal from the outside, and a parasitic diode Dk serving as a diode portion that is arranged in parallel to the MOSFET unit SWk and is configured to allow current flow in a regular output direction and interrupt current flow in a reverse direction. For example, the source of the switching element SC1 is connected to the inductor L1, and its drain is connected to the second conductive path 7. The MOSFET unit SW1 serves as a switching portion, and the parasitic diode D1 serves as a diode portion.

The MOSFET units SW1, SW2, . . . SWm constituting the switching elements SC1, SC2, . . . SCm are all configured to be switched between ON and OFF in accordance with signals from the control unit 3, and the voltages that are applied to their gates are controlled by the control unit 3.

The control unit 3 mainly includes a control circuit 10 and a PWM drive unit 18. The control circuit 10 is a circuit that includes a microcomputer for example, and is provided with: a CPU 12 configured to perform various types of calculation processing; a storage unit 14 constituted by a ROM, a RAM, a nonvolatile memory, and the like; an AM converter 16 configured to convert an analog voltage into a digital signal; and the like. A voltage value output from a current detection unit 9A, which will be described later, and a voltage value on the second conductive path 7 are input to the A/D converter 16.

In the control unit 3, the control circuit 10 has functions of determining a duty ratio, and generating and outputting a PWM signal having the determined duty ratio, that is, the control circuit 10 generates and outputs PWM signals for the respective m voltage conversion units CV1, CV2, . . . CVm. For example, when all of the m voltage conversion units CV1, CV2, . . . CVm are driven in a steady output state after completion of soft start control, which will be described later, the control circuit 10 generates PWM signals whose phases differ from each other by $2\pi/m$, and outputs the generated PWM signals to the respective m voltage conversion units CV1, CV2, . . . CVm. If, for example, the multiphase conversion unit 2 is constituted by four voltage conversion units CV1, CV2, CV3, and CV4 as shown in FIG. 1, in the steady output state in which all of the phases are driven, PWM signals whose phases differ from each other by $2\pi/4$ are given to the respective phases.

The PWM drive unit 18 applies ON signals for alternately turning on the switching elements SAk and SBk of each phase (where k is an integer of 1 to m), based on the PWM signal for each phase generated by the control circuit 10, to the gates of the switching elements SAk and SBk. While the PWM signals are output to the switching elements SAk and SBk, the signal that is output to the gate of the switching element SBk has its phase substantially inverted with respect to that of the signal output to the gate of the switching element SAk, while a dead time is ensured.

A detection unit 8 is provided with the current detection unit 9A for detecting an output current, and a voltage detection unit 9B for detecting an output voltage, the current detection unit 9A and the voltage detection unit 9B respectively detecting values reflecting an output current and an output voltage on the common output path (second conductive path 7) from the plurality of voltage conversion units CV1, CV2, . . . CVm. The current detection unit 9A should be configured to output, as a detected value, a voltage value that corresponds to a current flowing through the second conductive path 7. For example, the current detection unit 9A includes a resistor and a differential amplifier that are provided on the second conductive path 7 such that a voltage between both ends of the resistor is input to the differential amplifier, the amount of voltage drop occurring in the resistor due to a current flowing through the second conductive path 7 is amplified by the differential amplifier, and the amplified amount of voltage drop is output to the A/D converter 16 of the control circuit 10 as a detected value. The voltage detection unit 9B is configured as, for example, a path through which a value reflecting the voltage on the second conductive path 7 (such as the voltage itself or a divided voltage of the second conductive path 7) is input to the A/D converter 16 of the control circuit 10, and in the example of FIG. 1, the voltage detection unit 9B is configured to be branched from the second conductive path 7, and is conductively connected to the A/D converter 16 of the control circuit 10.

In the multiphase converter 1 with such a configuration, the control unit 3 outputs complementary PWM signals to the respective m voltage conversion units CV1, CV2, . . . CVm with a dead time set. For example, with respect to the gates of the switching elements SAk and SBk of the k-th phase voltage conversion unit CVk, the control unit 3 outputs an OFF signal to the gate of the switching element SBk while outputting an ON signal to the gate of the switching element SAk, and outputs an ON signal to the gate of the switching element SBk while outputting an OFF signal to the gate of the switching element SAk, with a dead time set. In response to such complementary PWM signals, the voltage conversion unit CVk switches the switching element SAk on and off in synchronization with switching the switching element SBk on and off, to step down a DC voltage applied to the input-side conductive path LAk, and output the resultant DC voltage to the output-side conductive path LBk. The output voltage of the output-side conductive path LBk depends on the duty ratio of the PWM signal applied to the gates of the switching elements SAk and SBk. The same control is performed for every integer k from 1 to m, that is, the same control is performed on the first to the m-th phase voltage conversion units.

When activating the multiphase conversion unit 2, the control unit 3 individually controls a portion or all of the plurality of voltage conversion units CV1, CV2, . . . CVm using control signals (PWM signals), and performs feedback control so that the output from the multiphase conversion unit 2 is equal to a set target value. Specifically, based on a current value on the second conductive path 7 input to the control circuit 10 and a target value for output current (target current value), the control unit 3 determines a control amount (duty ratio) using known PID control feedback calculation. For example, in a steady output state in which the number of driven phases (driven phase number) is N, the target value for output current (target current value) is fixed at a value that corresponds to the driven phase number N, and PWM signals with the duty ratio determined by the feedback calculation are respectively output to N voltage conversion units with the phases that differ from each other by $2\pi/N$.

The following will describe initial control (soft start control) performed when operation of the multiphase converter 1 is started. Note that in FIG. 2, control that is performed on the configuration of FIG. 1 (that is, a configuration in which the number of phases m is 4) will be described as a representative example.

Figure 2:
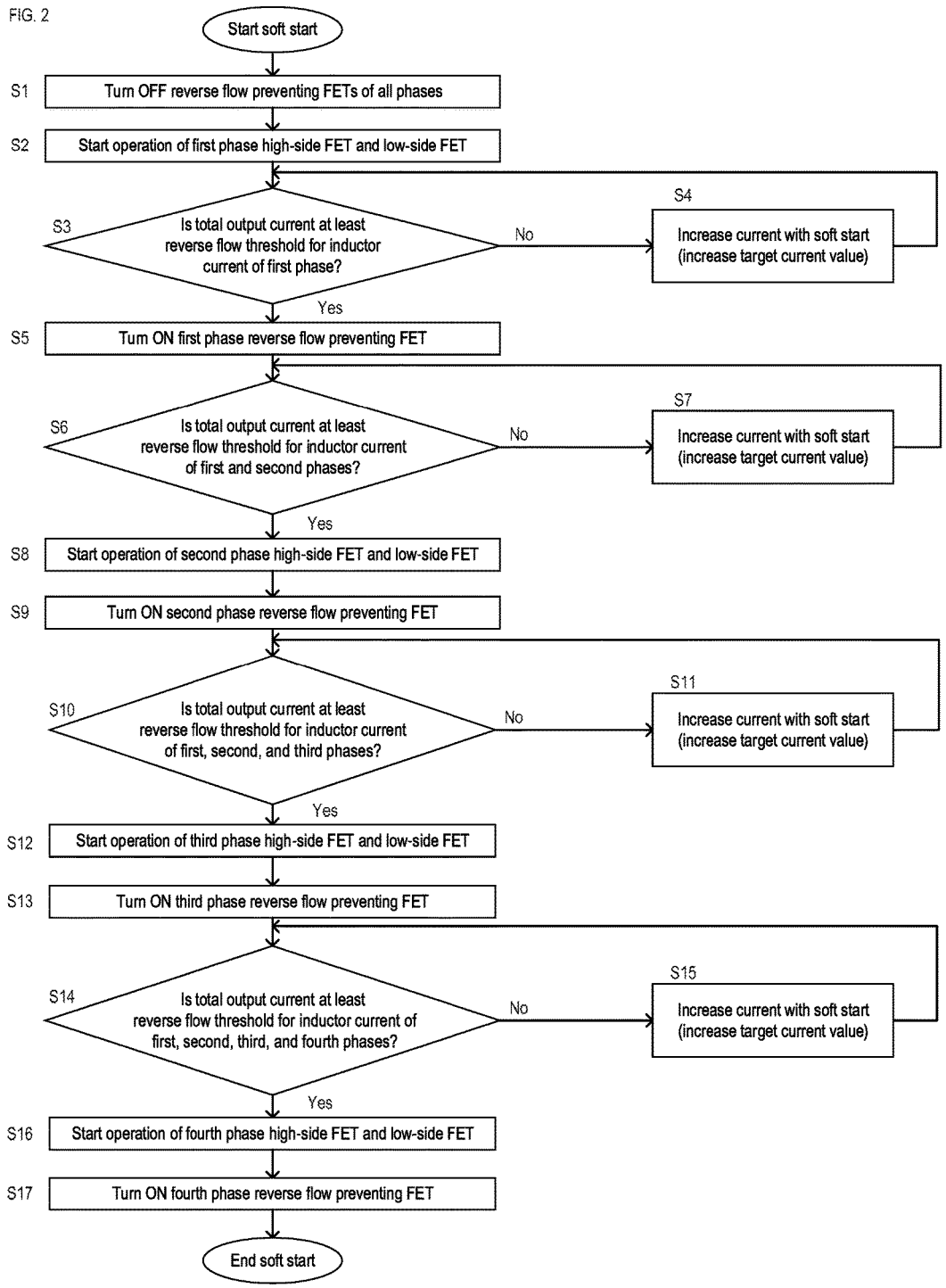
FIG. 2 is a flowchart illustrating an example of a flow of control when the multiphase converter of Embodiment 1 is started to perform output.

In the multiphase converter 1, the control unit 3 performs control in accordance with the flow of FIG. 2 when a predetermined operation start condition is met. The operation start condition is, for example, an ignition signal being switched from OFF to ON or the like, or may be another operation start condition.

When the initial control shown in FIG. 2 is started, the control unit 3 turns off the switching elements (reverse flow preventing FETs) SC1, SC2, SC3, and SC4 provided in all of the phases (that is, all of the plurality of voltage conversion units CV1, CV2, CV3, and CV4 constituting the multiphase conversion unit 2) (step S1). With this processing of step S1, all of the MOSFET units SW1, SW2, SW3, and SW4 are kept in the OFF state.

After the processing of step S1, the control unit 3 outputs complementary PWM signals to the switching element SA1 (high-side FET) and the switching element SB1 (low-side FET) of the first phase, and starts voltage conversion using the first phase voltage conversion unit CV1 (step S2). Note that after the voltage conversion using the first phase voltage conversion unit CV1 has been started in step S2, soft start control is performed on the first phase voltage conversion unit CV1. While the soft start control is performed only for the first phase, the average output current (average inductor current) from the first phase voltage conversion unit CV1 serves as an average total output current of the multiphase conversion unit 2, and in this control, feedback control is repeated while gradually increasing the target value for the output of the multiphase conversion unit 2, so that the output of the multiphase conversion unit 2 (that is, the output of the first phase voltage conversion unit CV1) is equal to a set target value.

After the soft start control for the first phase has been started in step S2, the control unit 3 determines whether or not the average of the total output current flowing through the second conductive path 7 is at least a predetermined threshold It0 (step S3). The predetermined threshold It0 is a "reverse flow threshold for the inductor current of the first phase", that is, a lower limit of a range of total output current in which no reverse flow will occur when only the first phase voltage conversion unit CV1 is driven in the multiphase conversion unit 2. In other words, when only the first phase voltage conversion unit CV1 is driven in the multiphase conversion unit 2, there is no time period in which a reverse flow occurs in the second conductive path 7, if the average of the total output current flowing through the second conductive path 7 (the average inductor current of the first phase) is at least the predetermined threshold It0.

If it is determined in step S3 that the average of the total output current flowing through the second conductive path 7 is less than the predetermined threshold It0, then the procedure advances to "NO" in step S3, and the control unit 3 increases the target value for the total output current (target current value) while continuing the soft start control for the first phase (step S4). Then, after the target value has been increased in the processing of step S4, the determination processing of step S3 is performed again. In other words, the processes of steps S3 and S4 are repeated until the average of the total output current flowing through the second conductive path 7 reaches the predetermined threshold It0.

Figure 3:
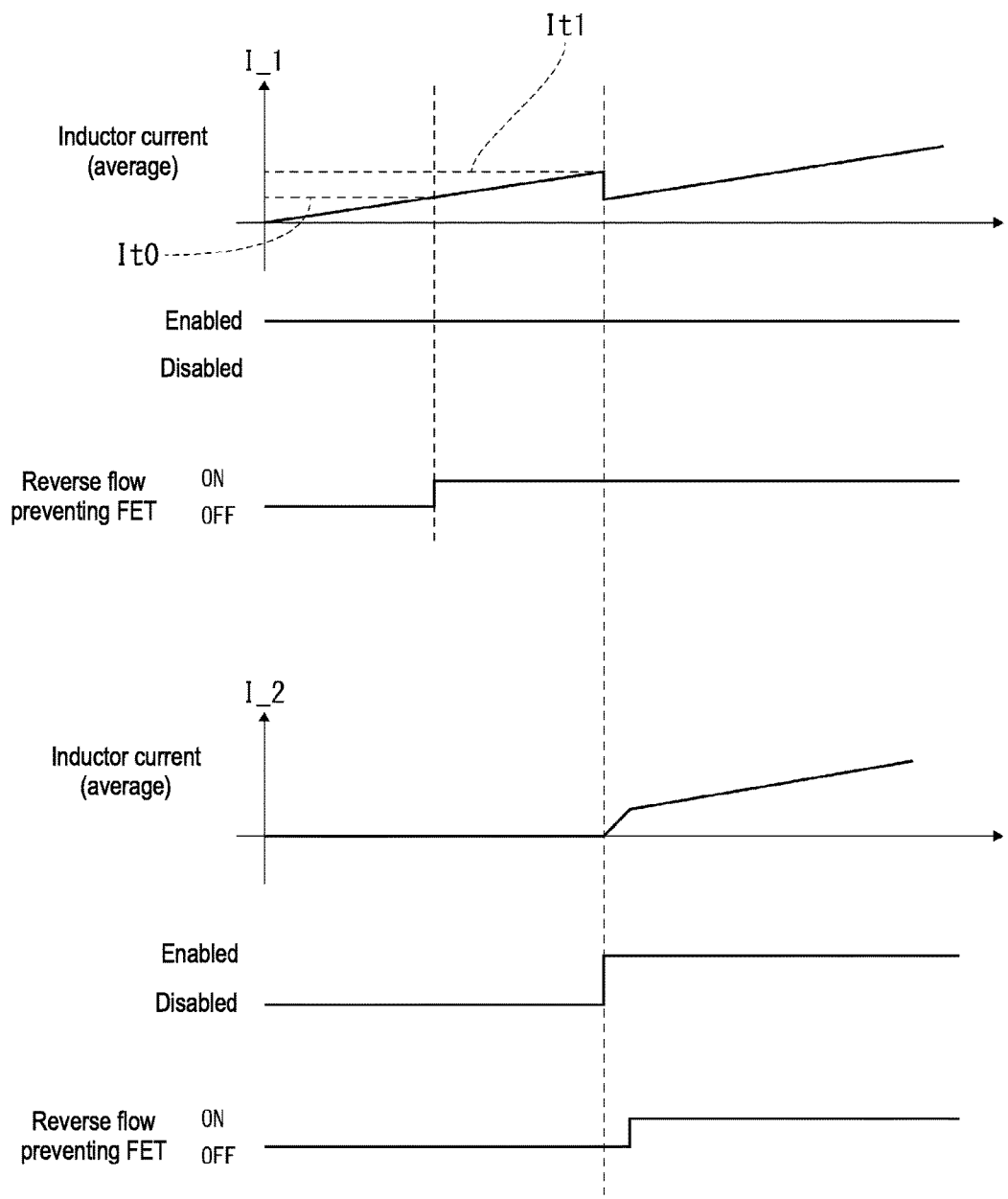
FIG. 3 shows, in the upper half, graphs and timing charts illustrating the relationship between an inductor current (average), ON/OFF of operation, and ON/OFF of a reverse flow preventing FET of a first phase voltage conversion unit, and the elapsed time, and in the lower half, graphs and timing charts illustrating the relationship between an inductor current (average), ON/OFF of operation, and ON/OFF of a reverse flow preventing FET of a second phase voltage conversion unit, and the elapsed time.
Figure 4:
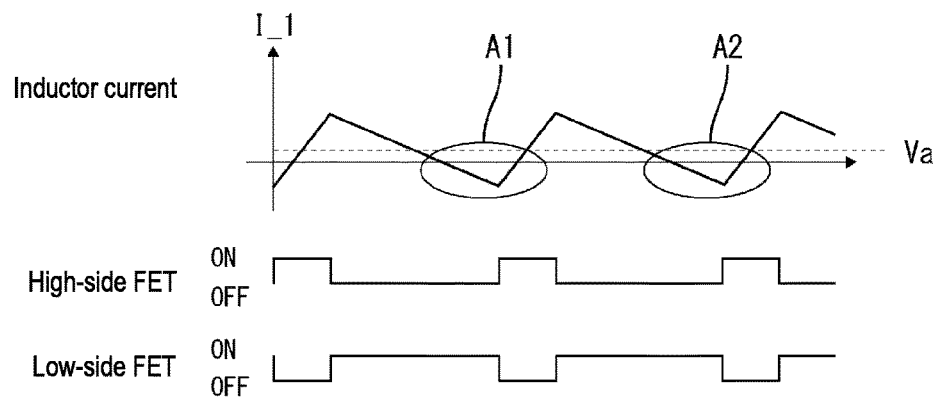
FIG. 4 shows graphs and timing charts illustrating the relationship between an inductor current, ON/OFF of FETs of one phase of a multiphase converter serving as Comparative Example 1, and elapsed time.
Figure 5:
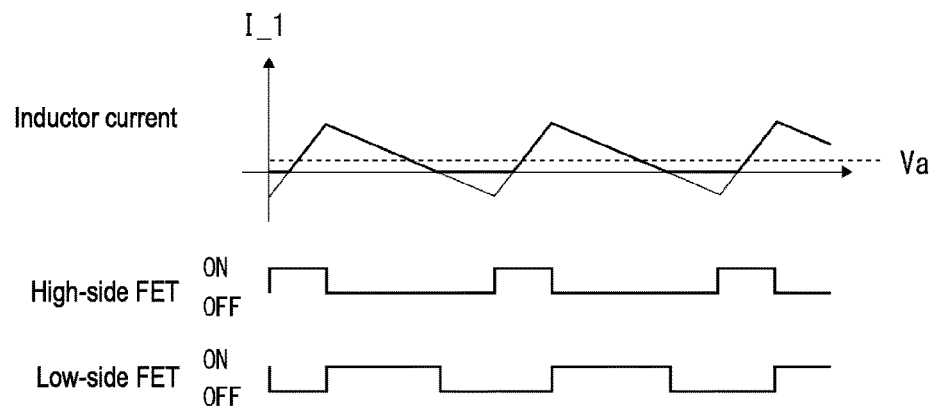
FIG. 5 shows graphs and timing charts illustrating the relationship between an inductor current, ON/OFF of FETs of one phase of a multiphase converter serving as Comparative Example 2, and elapsed time.

If it is determined in step S3 that the average of the total output current flowing through the second conductive path 7 is at least the predetermined threshold It0, then the procedure advances to "YES" in step S3, and the control unit 3 turns on the switching element SC1 (reverse flow preventing FET) of the first phase voltage conversion unit CV1. In other words, as shown in the upper half of FIG. 3, the average of the total output current (average inductor current of the first phase) flowing through the second conductive path 7 is gradually increased after the start of the soft start control for the first phase voltage conversion unit CV1, and the switching element SC1 (reverse flow preventing FET) is kept in the OFF state until this value reaches the predetermined threshold It0, and is switched to the ON state after the value has reached the predetermined threshold It0. Since, after the processing of step S2 and before execution of processing of step S5, the MOSFET unit SW1 is in the OFF state, an output current of the first phase voltage conversion unit CV1 will flow through the parasitic diode D1. On the other hand, after the execution of the processing of step S5, the MOSFET unit SW1 is in the ON state and an output current will flow through not only the parasitic diode D1 but also mainly the MOSFET unit SW1.

After the processing of step S5, it is determined whether or not the average of the total output current flowing through the second conductive path 7 is at least an individual threshold It1 (step S6). In the present configuration, an individual threshold is set in association with the driven phase number, and information in which the driven phase number and the individual threshold are associated with each other is stored in, for example, a storage unit 14. Specifically, the individual threshold It1 is set in association with the driven phase number "1", an individual threshold It2 is set in association with the driven phase number "2", and an individual threshold It3 is set in association with the driven phase number "3".

For example, the individual threshold It1, which is associated with the driven phase number "1", is a "reverse flow threshold for the inductor current of the first and second phases", that is, a lower limit of a range of the total output current (average total output current) in which no reverse flow will occur even if, while the first phase voltage conversion unit CV1 is continued to be driven, the next phase (second phase) voltage conversion unit CV2 is driven. In other words, when only the first and second phase voltage conversion units CV1 and CV2 are driven in the multiphase conversion unit 2, there is no time period in which a reverse flow occurs in the second conductive path 7, if the average of the total output current flowing through the second conductive path 7 is at least the individual threshold It1. Specifically, if the first and second phase voltage conversion units CV1 and CV2 are driven with the same duty ratio, the average current flowing through each phase is equal to one half of the average total output current, and both the first and second phase voltage conversion units CV1 and CV2 are configured such that no reverse flow will occur if the average output current (inductor currents) of each phase is at least It1/2.

If it is determined in step S6 that the average of the total output current flowing through the second conductive path 7 is less than the individual threshold It1, then the procedure advances to "NO" in step S6, and the control unit 3 increases the target value for the total output current (target current value) while further continuing the soft start control for the first phase (step S7). Then, after the target value has been increased in the processing of step S7, the determination processing of step S6 is performed again. In other words, the processes of steps S6 and S7 are repeated until the average of the total output current flowing through the second conductive path 7 reaches the individual threshold It1.

If it is determined in step S6 that the average of the total output current flowing through the second conductive path 7 is at least the individual threshold It1, then the procedure advances to "YES" in step S6, and the control unit 3 also outputs complementary PWM signals to the switching element SA2 (high-side FET) and the switching element SB2 (low-side FET) of the second phase, in addition to the first phase voltage conversion unit CV1, and starts voltage conversion using the second phase voltage conversion unit CV2 (step S8). Furthermore, the MOSFET unit SW2 of the switching element SC2 (reverse flow preventing FET) in the second phase voltage conversion unit CV2 is turned on (step S9). In other words, as shown in the upper half (illustrating the first phase) and in the lower half (illustrating the second phase) of FIG. 3, the average of the total output current (average inductor current of the first phase) flowing through the second conductive path 7 is gradually increased after the start of the soft start control for the first phase voltage conversion unit CV1, and the second phase is kept in a disabled state until this value reaches the individual threshold It1, and is switched to an enabled state after the value has reached the individual threshold It1, and immediately thereafter, the second phase switching element SC2 (reverse flow preventing FET) is turned on.

After the voltage conversion using the second phase voltage conversion unit CV2 has been started in step S8, soft start control is performed on the first and second phase voltage conversion units CV1 and CV2. In the soft start control for the first phase and the second phase, the target value for the total output current (target current value) is gradually increased from the value at the start of step S8. The target value for each phase is equal to one half of the target value of total output currents, and feedback control is performed so that the output current for each phase approaches the target value for each phase.

After the processing of step S9, it is determined whether or not the average of the total output current flowing through the second conductive path 7 is at least the individual threshold It2 (step S10). The individual threshold It2, which is associated with the driven phase number "2", is a "reverse flow threshold for the inductor current of the first, second, and third phases", that is, a lower limit of a range of total output current (average total output current) in which no reverse flow will occur even if, while the first and second phase voltage conversion units CV1 and CV2 are continued to be driven, the next phase (third phase) voltage conversion unit CV3 is driven. In other words, when only the first, second, and third phase voltage conversion units CV1, CV2, and CV3 are driven in the multiphase conversion unit 2, there is no time period in which a reverse flow occurs in the second conductive path 7, if the average of the total output current flowing through the second conductive path 7 is at least the individual threshold It2. Specifically, if the first, second, and third phase voltage conversion units CV1, CV2, and CV3 are driven with the same duty ratio, the average current flowing through each phase is equal to one third of the average total output current, and all of the first, second, and third phase voltage conversion units CV1, CV2, and CV3 are configured such that no reverse flow will occur if the average output current (inductor currents) of each phase is at least It2/3.

If it is determined in step S10 that the average of the total output current flowing through the second conductive path 7 is less than the individual threshold It2, then the procedure advances to "NO" in step S10, and the control unit 3 increases the target value for the total output current (target current value) while further continuing the soft start control for the first phase and the second phase (step S11). Then, after the target value has been increased in the processing of step S11, the determination processing of step S10 is performed again. In other words, the processes of steps S10 and S11 are repeated until the average of the total output current flowing through the second conductive path 7 reaches the individual threshold It2.

If it is determined in step S10 that the average of the total output current flowing through the second conductive path 7 is at least the individual threshold It2, then the procedure advances to "YES" in step S10, and the control unit 3 also outputs complementary PWM signals to the switching element SA3 (high-side FET) and switching element SB3 (low-side FET) of the third phase, in addition to the first and second phase voltage conversion units CV1 and CV2, and starts voltage conversion using the third phase voltage conversion unit CV3 (step S12). Furthermore, the MOSFET unit SW3 of the switching element SC3 (reverse flow preventing FET) in the third phase voltage conversion unit CV3 is turned on (step S13).

After the voltage conversion using the third phase voltage conversion unit CV3 has been started in step S12, soft start control is performed on the first, second, and third phase voltage conversion units CV1, CV2, and CV3. In the soft start control for the first phase, the second phase, and the third phase, the target value for the total output current (target current value) is gradually increased from the value at the start of step S12. The target value for each phase is equal to one third of the target value for the total output current, and feedback control is performed so that the output current for each phase approaches the target value for each phase.

After the processing of step S13, it is determined whether or not the average of the total output current flowing through the second conductive path 7 is at least the individual threshold It3 (step S14). The individual threshold It3, which is associated with the driven phase number "3", is a "reverse flow threshold for the inductor current of the first, second, third, and fourth phases", that is, a lower limit of a range of total output current (average total output current) in which no reverse flow will occur even if, while the first, second, and third phase voltage conversion units CV1, CV2, and CV3 are continued to be driven, the next phase (fourth phase) voltage conversion unit CV4 is driven. In other words, if all of the phase voltage conversion units CV1, CV2, CV3, and CV4 are driven in the multiphase conversion unit 2, there is no time period in which a reverse flow occurs in the second conductive path 7, if the average of the total output current flowing through the second conductive path 7 is at least the individual threshold It3. Specifically, if the voltage conversion units CV1, CV2, CV3, and CV4 of all the phases are driven with the same duty ratio, the average current flowing through each phase is equal to one fourth of the average total output current, and all of the voltage conversion units CV1, CV2, CV3, and CV4 are configured such that no reverse flow will occur if the average output current (inductor currents) of each phase is at least It3/4.

If it is determined in step S14 that the average of the total output current flowing through the second conductive path 7 is less than the individual threshold It3, then the procedure advances to "NO" in step S14, and the control unit 3 increases the target value for the total output current (target current value) while further continuing the soft start control for the first phase, the second phase, and the third phase (step S15). Then, after the target value has been increased in the processing of step S15, the determination processing of step S14 is performed again. In other words, the processes of steps S14 and S15 are repeated until the average of the total output current flowing through the second conductive path 7 reaches the individual threshold It3.

If it is determined in step S14 that the average of the total output current flowing through the second conductive path 7 is at least the individual threshold It3, then the procedure advances to "YES" in step S14, and the control unit 3 also outputs complementary PWM signals to the switching element SA4 (high-side FET) and switching element SB4 (low-side FET) of the fourth phase, in addition to the first, second, and the third phase voltage conversion units CV1, CV2, and CV3, and starts voltage conversion using the fourth phase voltage conversion unit CV4 (step S16). Furthermore, the MOSFET unit SW4 of the switching element SC4 (reverse flow preventing FET) in the fourth phase voltage conversion unit CV3 is turned on (step S17).

After the voltage conversion using the fourth phase voltage conversion unit CV4 has been started in step S16, soft start control is performed for all of the phases. In the soft start control for all of the phases, the target value for the total output current (target current value) is gradually increased from the value at the start of step S16. The target value for each phase is equal to one fourth of the target value for the total output current, and feedback control is performed so that the output current for each phase approaches the target value for each phase. The soft start control is complete when the target value for the total output current has finally reached a constant value. Thereafter, the steady output state is achieved in which the target value for the total output current is set to the constant value.

As described above, in the present configuration, when performing the initial control shown in FIG. 2, the control unit 3 sequentially drives the plurality of voltage conversion units CV1, CV2, CV3, and CV4 by offsetting points in time at which the driving is started against each other, determines, each time any of the voltage conversion units CV1, CV2, CV3, and CV4 is started to be driven, whether or not the value detected by the detection unit 8 has reached an individual threshold associated with the number of voltage conversion units of the multiphase conversion unit 2 that have been driven, and starts to drive the next phase voltage conversion unit. In other words, after the driving of each of voltage conversion units that are sequentially driven has been started, control is performed such that the output current is increased to a threshold that corresponds to the number of operating voltage conversion units (driven phase number) and then the next voltage conversion unit is driven. Since, in this way, each time a voltage conversion unit is started to be driven, the output current is increased to a current value that corresponds to the driven phase number at the moment to ensure the amount of current, and then the next voltage conversion unit is driven, it is possible to prevent a reverse flow of the output current.

Moreover, the control unit 3 keeps the MOSFET unit SW1 (switching portion) in the OFF state during a time period from the start of the driving of the voltage conversion unit CV1, which is driven at first, until the total output current value specified by detected values detected by the detection unit 8 reaches the predetermined threshold It0. In this time period, the output currents flow through the parasitic diode D1. Then, the MOSFET unit SW1 is switched to the ON state after the total output current value specified by detected values detected by the detection unit 8 has reached the predetermined threshold It0.

The following will describe examples of the main effects of the present configuration.

In the multiphase converter 1 of the present configuration, the control unit 3 sequentially drives the plurality of voltage conversion units CV1, CV2, CV3, and CV4 by offsetting the points in time at which the driving is started against each other, when operation of the multiphase conversion unit 2 is started. After the driving of each of the voltage conversion units CV1, CV2, CV3, and CV4 that are sequentially driven has been started, control is performed such that an output current is increased to a threshold that corresponds to the number of operating voltage conversion units (driven phase number), and then the next voltage conversion unit is driven. In other words, each time any of the voltage conversion units CV1, CV2, CV3, and CV4 is started to be driven, the output current is increased to a current value that corresponds to the driven phase number at the moment to ensure the amount of current, and then the next voltage conversion unit is driven. By performing such control, it is possible to shorten a time period in which an output current is reduced (time period in which an output current is so small that a reverse flow occurs) after the start of the driving of each of the second voltage conversion units onward that are sequentially driven, and to suppress a reverse flow of the output current.

Accordingly, it is possible to realize a configuration that can subject, when operation of the multiphase conversion unit 2 is started, the voltage conversion units CV1, CV2, CV3, and CV4 to control of gradually increasing a target value for output, and can suppress a reverse flow, more easily and further avoiding a loss.

Furthermore, in the present configuration, during the initial time period after the driving of the first voltage conversion unit CV1 has been started (time period from the start of the driving until the value detected by the detection unit 8 reaches a predetermined threshold), the MOSFET unit SW1 (switching portion) is switched to the OFF state, and an electric current is caused to flow by diode rectification using the parasitic diode D1 (diode portion), and thus it is possible to reliably prevent a reverse flow even during the initial time period in which an output current is reduced. Furthermore, after the value detected by the detection unit 8 has reached the predetermined threshold, that is, after an output current by the voltage conversion unit CV1, which is first driven, has been increased to some extent, the MOSFET unit SW1 (switching portion) can be switched to the ON state, and thus it is possible to reliably reduce a loss compared to a configuration in which diode rectification is continued.

Other Embodiments

The present invention is not limited to the embodiments explained with reference to the description above and the drawings, and the technical scope of the present invention encompasses the following embodiments, for example.

(1) Embodiment 1 has shown a step-down multiphase converter as an example, but a step-up multiphase converter or a step-up and -down multiphase converter may also be used.

(2) In Embodiment 1, a switching element SBk is arranged on the low side of each phase where k is an integer of 1 to m, but in place thereof, a diode whose anode is connected to a ground potential may be used. Furthermore, the switching elements SAk and SBk may also be P-channel type MOSFETs, or other switching elements such as bipolar transistors.

(3) The specific configurations of the primary side power supply portion 91 and the secondary side power supply portion 92 of Embodiment 1 are merely examples, and the type of the electrical storage means and voltages generated by the electrical storage means are not limited to the above-described examples, and may vary. Furthermore, a configuration is also possible in which no secondary side power supply portion is included, for example.

(4) In the example of FIG. 1, power generators, loads, and the like that are connected to the input-side conductive path and the output-side conductive path are not shown, but various devices and electronic components may be connected to the input-side conductive path and the output-side conductive path.

(5) In FIG. 1, a four-phase structure multiphase converter 1 in which four voltage conversion units CV1, CV2, CV3, and CV4 are connected in parallel to each other is shown as a representative example, but the number of voltage conversion units may be a plural number less than 4, or a plural number at least 5.

The invention claimed is:

1. A multiphase converter comprising:
a multiphase conversion unit provided with a plurality of voltage conversion units each configured to convert a voltage input to an input-side conductive path and output the converted voltage to an output-side conductive path;
a control unit configured to individually control the voltage conversion units using control signals so that an output of the multiphase conversion unit is equal to a target value, and to subject, when operation of the multiphase conversion unit is started, the voltage conversion units to control of gradually increasing the target value for their output;
a detection unit configured to detect a value reflecting an output current from the multiphase conversion unit; and
switching elements that are respectively provided on the output-side conductive paths of the voltage conversion units, each switching element including a switching portion configured to be switched between an ON state and an OFF state in accordance with a signal from the outside, and a diode portion that is arranged in parallel to the switching portion, and is configured to allow current flow in a regular output direction and interrupt current flow in a reverse direction,
wherein the control unit is configured to sequentially drive, when the operation of the multiphase conversion unit is started, the plurality of voltage conversion units by offsetting the points in time at which their driving is started against each other, to determine, each time a voltage conversion unit is started to be driven, whether or not the value detected by the detection unit has reached an individual threshold associated with the number of voltage conversion units of the multiphase conversion unit that have started to be driven, and to start to drive the next voltage conversion unit when the value has reached the individual threshold, and
the control unit switches the switching portion of the voltage conversion unit that is first driven when the operation of the multiphase conversion unit is started to the OFF state, during a time period from the start of the driving of this voltage conversion unit until the value detected by the detection unit reaches a predetermined threshold smaller than the individual threshold, and switches the switching portion to the ON state after the value has reached the predetermined threshold.

* * * * *